United States Patent
Petri

(10) Patent No.: US 8,010,896 B2
(45) Date of Patent: Aug. 30, 2011

(54) USING PROFILING WHEN A SHARED DOCUMENT IS CHANGED IN A CONTENT MANAGEMENT SYSTEM

(75) Inventor: John Edward Petri, Lewiston, MN (US)

(73) Assignee: International Business Machines Corporation, Armonk, NY (US)

(*) Notice: Subject to any disclaimer, the term of this patent is extended or adjusted under 35 U.S.C. 154(b) by 1020 days.

(21) Appl. No.: 11/854,660

(22) Filed: Sep. 13, 2007

(65) Prior Publication Data

US 2009/0077110 A1 Mar. 19, 2009

(51) Int. Cl.
*G06F 7/00* (2006.01)
(52) U.S. Cl. ......... 715/272; 715/209; 715/229; 715/277
(58) Field of Classification Search ............... 715/200, 715/209, 229, 253, 272, 277
See application file for complete search history.

(56) References Cited

U.S. PATENT DOCUMENTS

| | | | | |
|---|---|---|---|---|
| 5,724,567 | A * | 3/1998 | Rose et al. | 1/1 |
| 7,111,194 | B1 * | 9/2006 | Schoenthal et al. | 714/7 |
| 7,134,606 | B2 * | 11/2006 | Chou | 235/494 |
| 7,139,971 | B1 * | 11/2006 | Otsubo | 715/210 |
| 7,594,163 | B2 * | 9/2009 | Slack-Smith | 715/200 |
| 2003/0105816 | A1 * | 6/2003 | Goswami | 709/204 |
| 2005/0039116 | A1 * | 2/2005 | Slack-Smith | 715/511 |
| 2007/0192155 | A1 * | 8/2007 | Gauger | 705/8 |
| 2008/0027792 | A1 * | 1/2008 | Wu | 705/12 |
| 2010/0095131 | A1 * | 4/2010 | Krueger et al. | 713/189 |

OTHER PUBLICATIONS

Eric Severson, Chief Technology Officer, Whitepaper, "Integrating XML Publishing with a Content Management System: Best Practices", pp. 1-21.
http://en.wikipedia.org/wiki/Microformats, "Microformat", pp. 1-5, printed Sep. 12, 2007.
Arbortext Online Help, "Profiling Overview", p. 1.

* cited by examiner

*Primary Examiner* — Stephen S Hong
*Assistant Examiner* — Gregory J Vaughn
(74) *Attorney, Agent, or Firm* — Martin & Associates, LLC; Derek P. Martin

(57) ABSTRACT

A content management system (CMS) includes a content modification mechanism that detects a change to a shared document in the repository, and in response to the detected change, inserts applicability metadata in the shared document. The content modification mechanism may broadcast the change to each parent document. Each parent document votes on whether or not to accept the change. If enough of the parent documents accept the change (i.e. the votes meet a defined voting threshold), the applicability metadata is removed from the shared content. If not enough of the parent documents accept the change, the applicability metadata remains in the shared content, and a profile corresponding to the applicability metadata is created for each parent document that accepted the change. In this manner, profiling may be used to account for changes to shared content in a content management system.

13 Claims, 11 Drawing Sheets

USING PROFILING WHEN A SHARED DOCUMENT IS CHANGED IN A CONTENT MANAGEMENT SYSTEM

BACKGROUND

1. Technical Field

This disclosure generally relates to content management systems, and more specifically relates to profiling in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Profiling is an XML content management technique in which elements of an XML document may be tagged with applicability metadata. This applicability metadata can be used by the CMS to filter content and only allow certain elements to be included. Currently, a profile for a document allows the content management system to extract only that content from the document that matches the profile. For example, a document for an owner's manual may include instructions in English and Spanish. If a new document is created with a profile of English, only the elements that match the English profile will be included in the new document. Similarly, if a new document is created with a profile of Spanish, only the elements that match the Spanish profile will be included in the new document. Profiling thus allows a way to select and filter content when a document is reconstituted (i.e. assembled) according to one or more defined profiles for the document.

Method 200 in FIG. 2 is a prior art method for reconstituting a document that may include a defined profile. Method 200 begins when a document needs to be reconstituted (step 210). The next element is retrieved (step 220). If the element has applicability metadata (step 230=YES), the element is included in the reconstituted document only if the document's profile matches the applicability metadata (step 250). If the element does not have applicability metadata (step 230=NO), the element is included in the document (step 240). If there are more elements to process (step 260=YES), method 200 loops back to step 220 and continues until there are no more elements to process (step 260=NO).

A sample document 300 is shown in FIG. 3. We assume document 300 is being reconstituted from a document that includes a link to document N 320, which includes two separate elements that each has applicability metadata. Note the document profile 310 is English. When the content management system encounters document N to incorporate into the reconstituted document 300, the CMS sees that document N 320 includes applicability metadata. Because the profile of the document 300 being reconstituted is English, which matches the applicability metadata for the first element 330, the first element 330 is incorporated into document 300 as shown in FIG. 3. Because the English profile of the document being reconstituted does not match the Spanish applicability metadata for the second element 340, the second element 340 is not included in the reconstituted document 300. Note that profiling may also be used when common elements are mixed with specific elements that vary based on applicability metadata. For example, a document might include a shipping address that has a street address, city and state that are common for all destinations. However, the format and location of the postal code varies depending on whether the address is an address in the United States or an address in a foreign country. In this case, there would be a single instance of the common data, with multiple instances of the postal code tagged with appropriate applicability metadata. These very simplified examples show how profiling is used in the prior art to include or exclude parts of a document depending on the profile of the document being created and the applicability metadata in the shared documents.

One of the significant features of content management systems is the ability to reuse data by sharing a common document in multiple parent documents. For example, if a content management system is used in a publishing company, a simple document that includes a copyright statement could be included in many other documents, which saves time by not requiring the author to type in a separate copyright statement for each created document. In this simple example, a copyright statement would be stored as a separate document in the repository, and each document that wants to use the copyright statement includes a link to the copyright statement document.

Sharing content in a content management system can create problems. For example, let's assume a first author creates a simple first document and checks the first document into the repository, and also creates a second document that includes a link to the first document. Now let's assume a second author is creating a third document, and determines he can simply link to the first document because the second author needs exactly what is in the first document to be incorporated into the third document. However, after the second author links to the first document in the third document, the first author could go back and change the first document. The change the first author makes to the first document might be inconsistent with the context where the second author used the first document, thereby creating a potential problem. Without a way to share content in a way that avoids this potential problem, context problems may arise when a shared document is changed.

BRIEF SUMMARY

A content management system (CMS) ensures that changes to shared content do not negatively affect parent documents that share the content. The CMS includes a content modification mechanism that detects a change to a shared document in the repository, and in response to the detected change, inserts applicability metadata in the shared document. The content modification mechanism may broadcast the change to each parent document. Each parent document votes on whether or not to accept the change. If enough of the parent documents accept the change (i.e. the votes meet a defined voting threshold), the applicability metadata is removed from the shared content. If not enough of the parent documents accept the change, the applicability metadata remains in the shared content, and a profile corresponding to the applicability metadata is created for each parent document that accepted the change. In this manner, profiling may be used to account for changes to shared content in a content management system.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

An improved content management system is disclosed herein that uses profiling to track changes to shared content by inserting applicability metadata in a shared document that is changed. A voting mechanism determines whether enough parent documents that shared the shared document accept the change, and if so, the applicability metadata may be removed. If not enough of the parent documents accept the change, a profile is sent to each parent document that accepted the change. In this manner profiling is used to assure a change to shared content in a content management system does not negatively affect documents that share the content.

Figure 1:
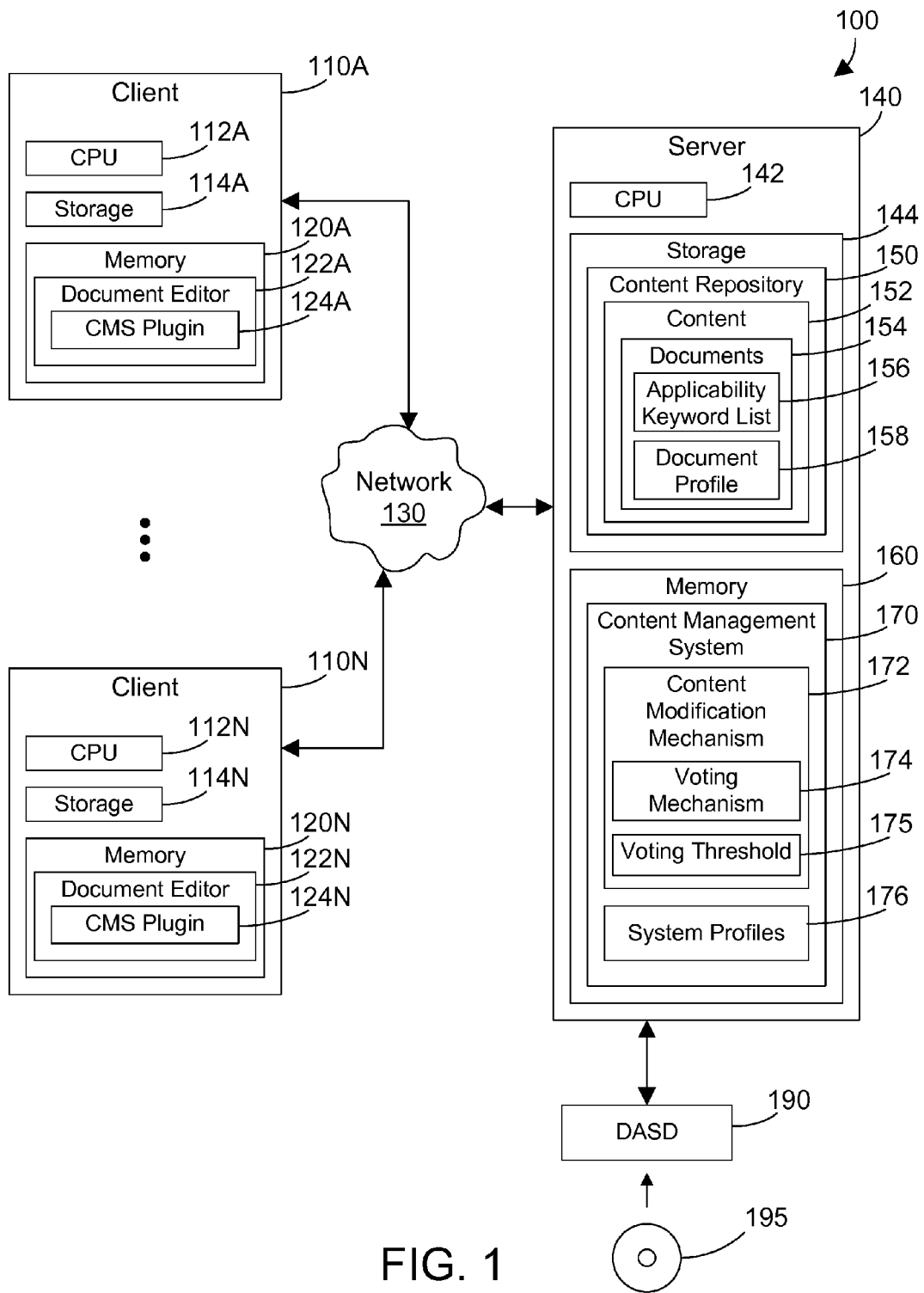
FIG. 1 is a block diagram of a networked computer system that includes a server computer system that has a content management system that includes a content modification mechanism that tracks changes to shared content.
Figure 2:
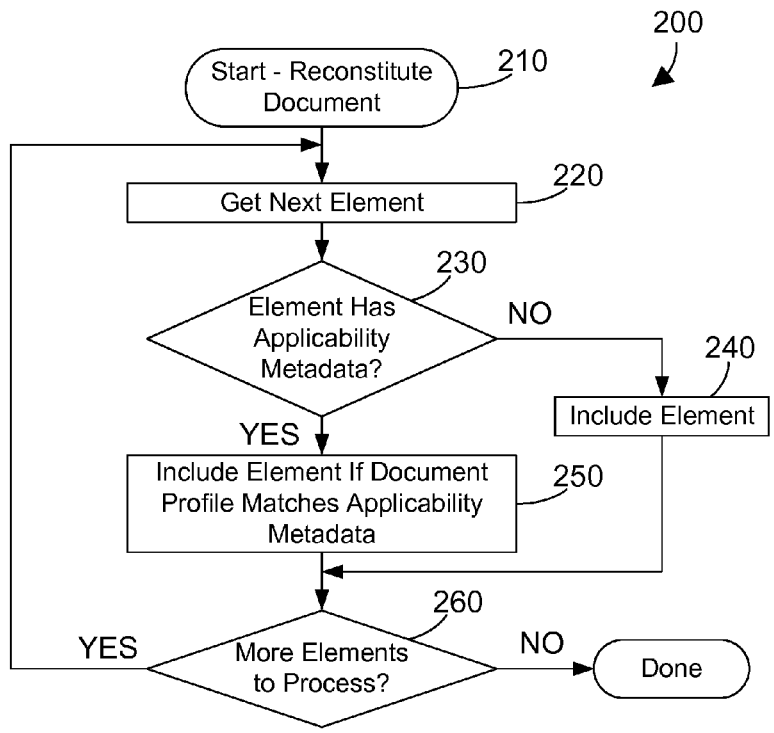
FIG. 2 is a flow diagram of a prior art method for using profiling when reconstituting a document.
Figure 3:
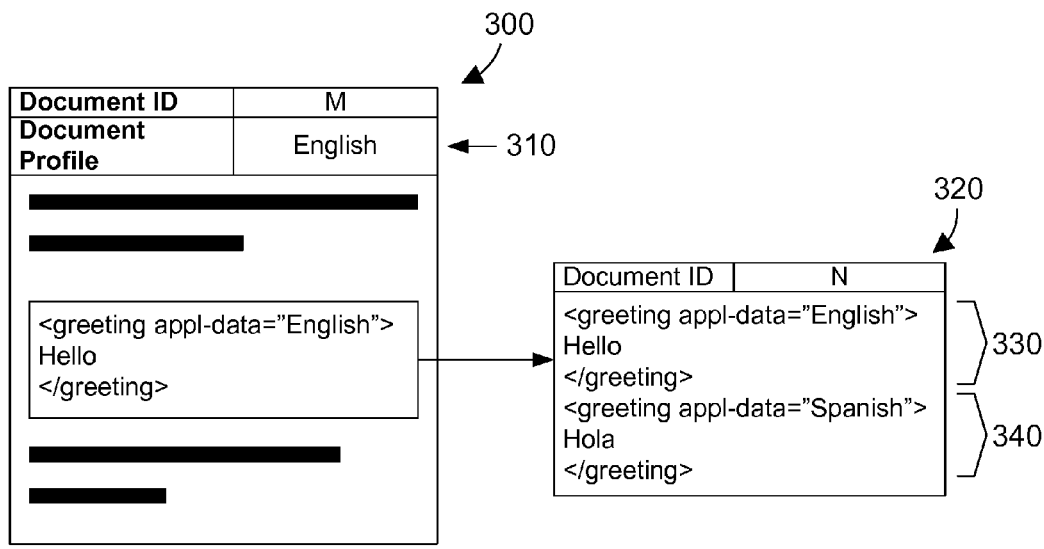
FIG. 3 is a block diagram showing a document being reconstituted that includes a profile, and shared content that includes applicability metadata.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. Content 152 may include one or more documents 154. As used in the disclosure and claims herein, the term "document" means any type of data that may be managed by a content management system, including all known types of data and objects as well as those developed in the future, and the term "element" means any section or portion of a document. Each of the one or more documents 154 may contain an applicability keywords list 156 and a document profile 158. Applicability keywords list 156 is a list of key words or terms that potentially match applicability metadata. Document profile 158 determines what content will be included in the document according to the applicability metadata in the elements that are included in the document.

One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes content modification mechanism 172 and system profiles 176. Content modification mechanism 172 preferably includes a voting mechanism 174 and a voting threshold 175. Content modification mechanism 172 detects when shared content is changed, and inserts applicability metadata in the shared content to reflect the change. Content modification mechanism 172 may also notify parent documents of the changes made to shared content. The voting mechanism 174 receives votes from the parent documents to accept or reject the change. Voting threshold 175 is a predefined threshold that determines whether the proposed change to the shared content will be made permanent in the shared content, or whether the applicability metadata needs to remain in the shared content to distinguish between those parent objects that want the change and the parent objects that do not want the change. System profiles 176 are profiles for documents in the CMS. Once a system profile is defined, a document may specify one or more of the system profiles, which will cause the document to include all elements that satisfy the profiles specified for the document and not include any elements that do not satisfy the profiles specified for the document.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 4:
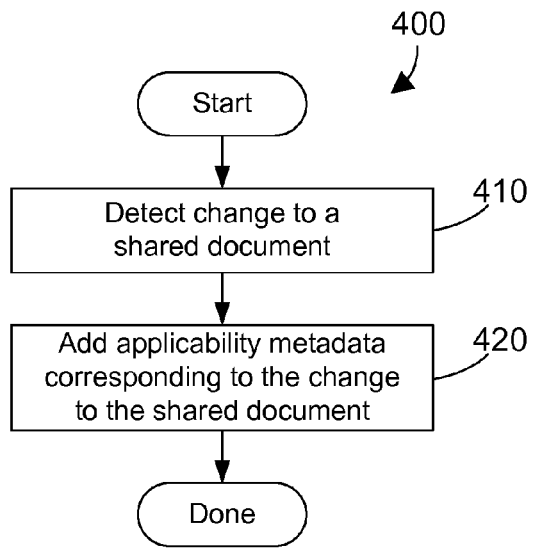
FIG. 4 is a flow diagram of a method for adding applicability metadata to a shared document when a change in the shared document is detected.

Referring to FIG. 4, a method 400 for making changes to shared content in a content management system begins by detecting a change to a shared document (step 410). Applicability metadata corresponding to the change is then added to the shared document (step 420) and method 400 is done. By adding applicability metadata to the shared document, the change may be accepted by some parent documents by enabling a corresponding profile, while the change may be rejected by other parent documents by not enabling the corresponding profile. The changed document may thus include two separate versions of data, unchanged and changed, and each parent document may determine which of the versions to use according to the enabled profile(s) in that parent document. In addition, a changed document may include common data that is always used by all documents that share the document.

Figure 5:
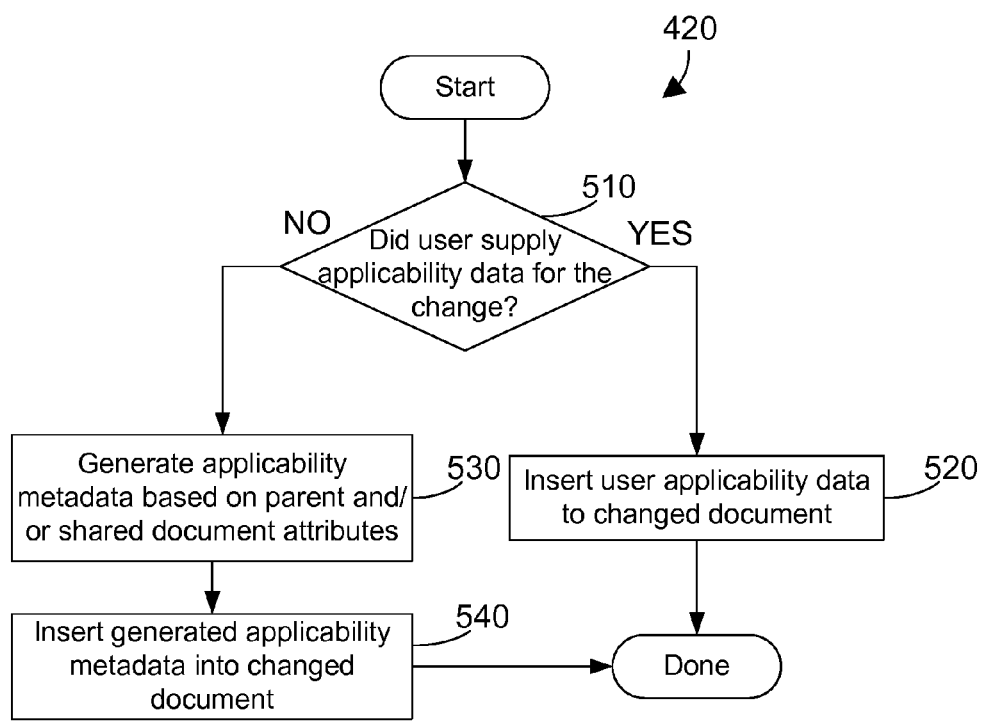
FIG. 5 is a flow diagram of a method for one suitable implementation of step 420 shown in FIG. 4.

Referring to FIG. 5, a method 420 shows one suitable implementation of step 420 shown in FIG. 4. If a user supplied applicability data for the change (step 510=YES) then the user-specified applicability data is inserted as the applicability data for the changed document (step 520). If a user does not supply applicability data for the change (step 510=NO), then applicability metadata may be automatically generated based on the parent and/or shared document attributes (step 530). The applicability metadata is then inserted into the changed shared document (step 540) and method 420 is done.

Figure 6:
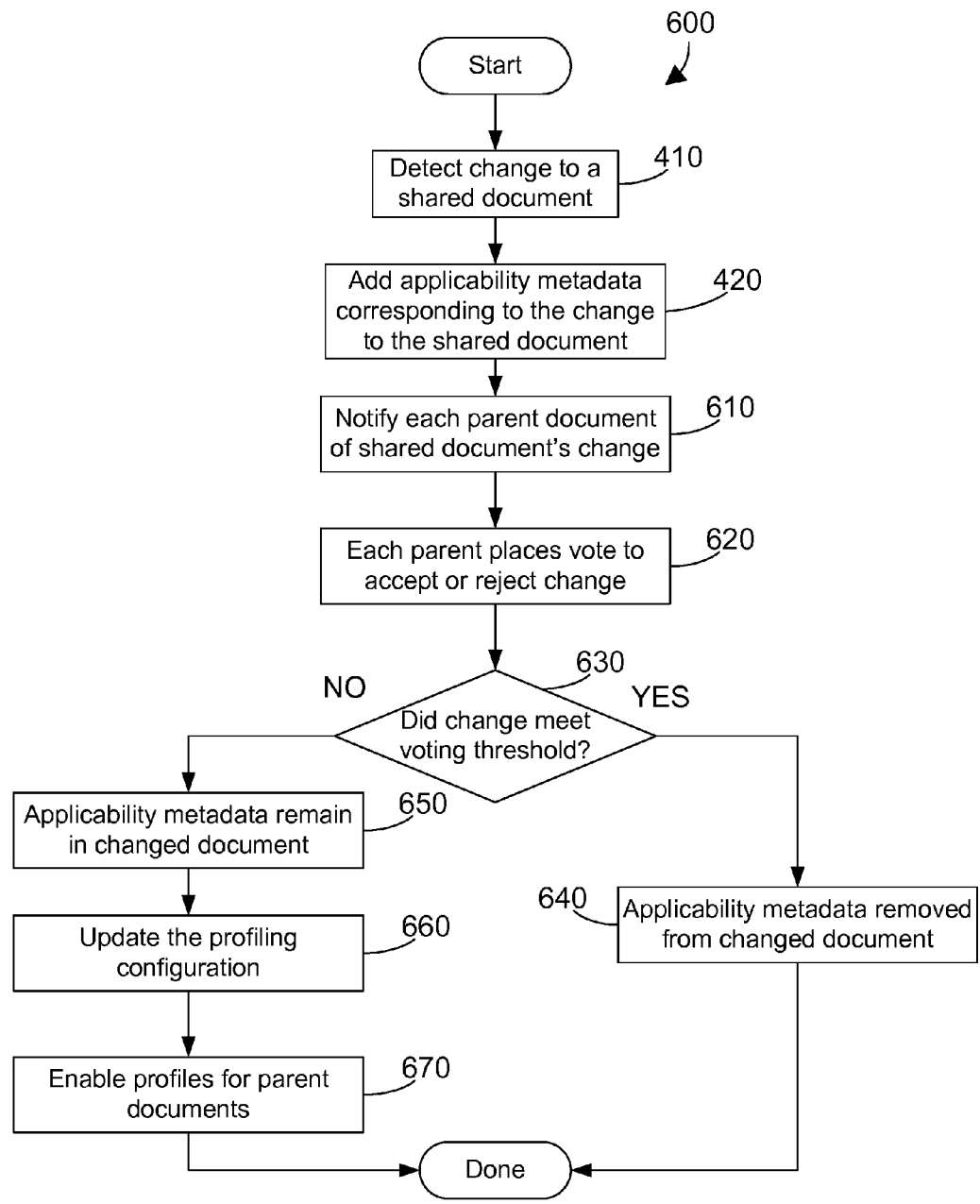
FIG. 6 is a flow diagram of a method for making changes to shared content in a content management system where parent documents are allowed to vote on changes made to shared documents.

Referring to FIG. 6, a method 600 is a more detailed implementation for method 400 in FIG. 4 that allows parent documents of a shared document to vote on the change. Method 600 begins by detecting a change to a shared document (step 410). Applicability metadata corresponding to the change is then added to the shared document (step 420). Each parent document of the shared document is notified of the changes made to the shared document (step 610 in FIG. 6). Each parent document places a vote to accept or reject the change made to the shared document (step 620). If the number of parent documents accepting the change made to the shared document meets the voting threshold (step 630=YES), then the applicability metadata is removed from the changed document (step 640) and method 600 is done. If the number of parent documents accepting the change made to the shared document does not meet the voting threshold (step 630=NO), then the applicability metadata remains in the changed document (step 650). The profiling configuration is updated (step 660) and profiles are enabled for the parent documents that voted to accept the change (step 670) so that the proper information may be included in the parent documents, and method 600 is done.

Figure 7:
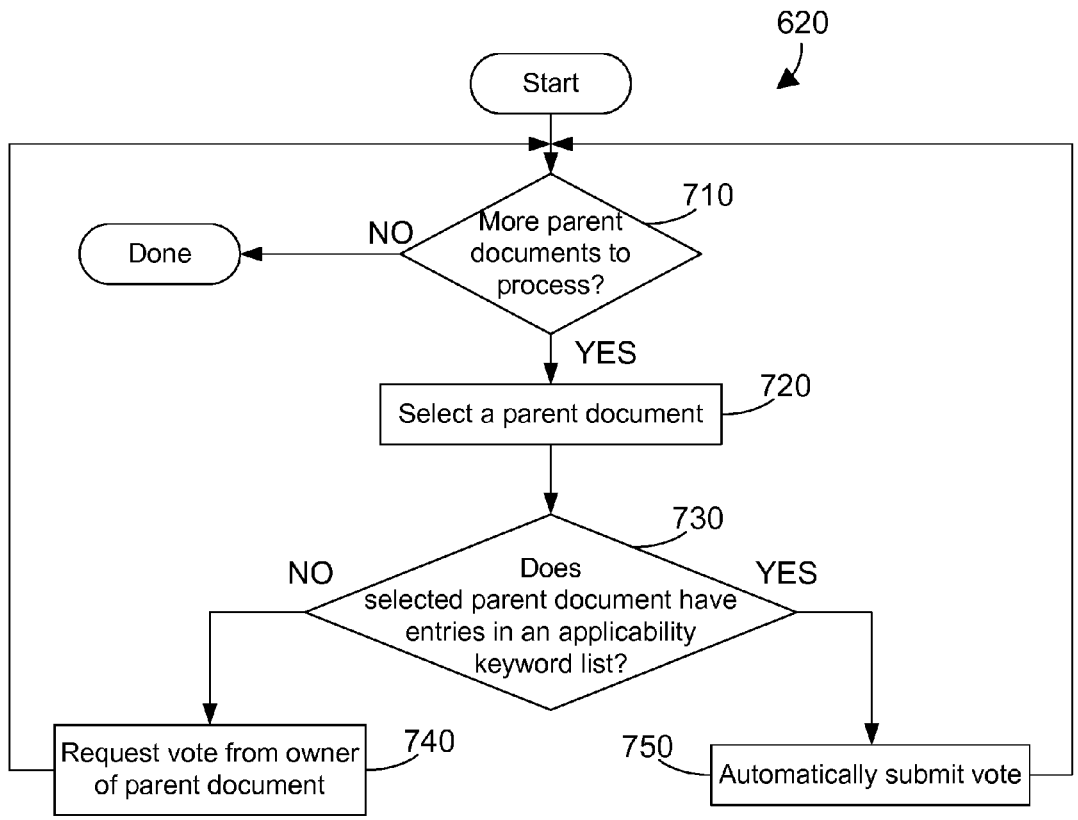
FIG. 7 is a flow diagram of a method for one suitable implementation of step 620 shown in FIG. 6.

Referring to FIG. 7, a method 620 shows one suitable implementation for step 620 shown in FIG. 6. While there are still parent documents that have not been processed (step 710=YES) one of the remaining parent documents is selected (step 720). If the selected parent document has an applicability keyword list 156 (step 730=YES), then a vote may be automatically submitted to voting mechanism 174 (step 750). If the selected parent document does not have an applicability keyword list 156 (step 730=NO), then the owner of the selected parent document, or other suitable user, such as an administrator, is requested to place a vote to accept or reject the change made to the shared document (step 740). Method 620 continues until there are no more parent documents to process (step 710=NO).

Figure 8:
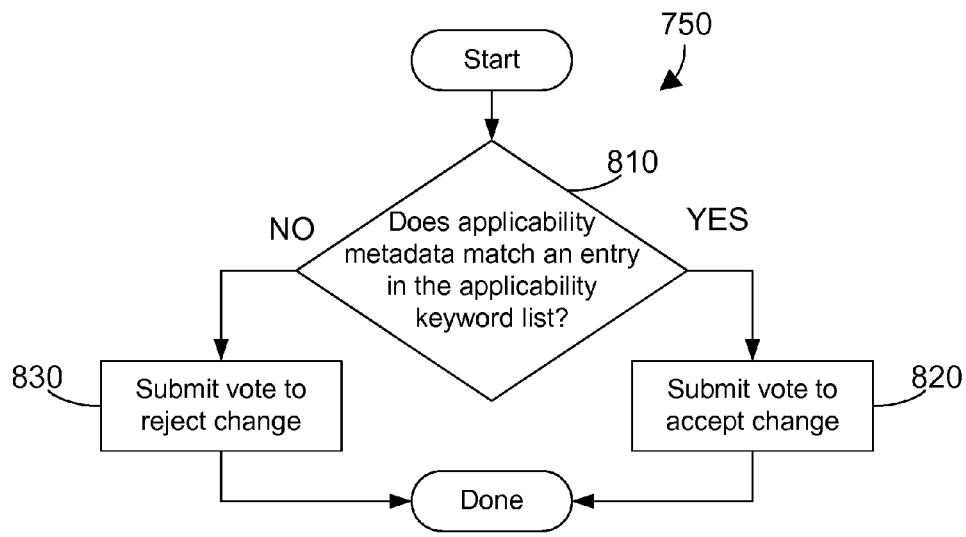
FIG. 8 is a flow diagram of a method for one suitable implementation of step 750 shown in FIG. 7.

FIG. 8 shows a method 750 for one suitable implementation to have a vote automatically submitted to voting mechanism 174 as shown in step 750 in FIG. 7. If the applicability metadata in the changed shared document matches an entry in the parent document's applicability keyword list (step 810=YES), then a vote is automatically submitted to accept the change made to the shared document (step 820). If the applicability metadata tag in the changed shared document does not match an entry in the parent document's applicability keyword list (step 810=NO), then a vote is automatically submitted to reject the change made to the shared document (step 830).

Note that variations in method 750 shown in FIG. 7 are within the scope of the disclosure and claims herein. For example, a policy or user preference could be defined that allows a user to select whether a yes vote will be automatically cast in step 820 and whether a no vote will be automatically cast in step 830. The user may want to retain control over the voting process by requiring notification and manual entry of both yes and no votes. Of course, the policy would also give the user the control to automatically cast yes votes in step 820 while requiring notification and manual entry of no votes in step 830, or to automatically cast no votes in step 830 while requiring notification and manual entry of yes votes in step 820.

Figure 9:
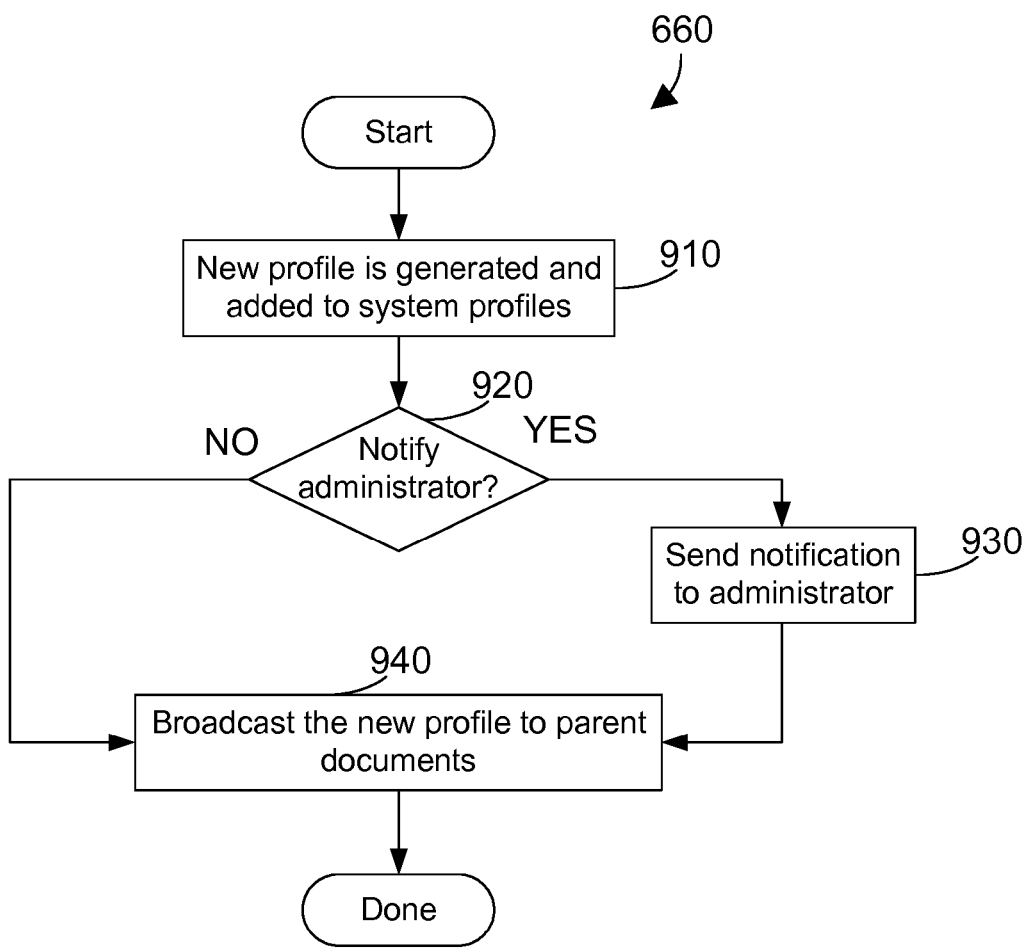
FIG. 9 is a flow diagram of a method for one suitable implementation of step 660 shown in FIG. 6.

FIG. 9 shows a method 660 for one suitable implementation for step 660 shown in FIG. 6. A new profile is generated and added to the system profiles 176 (step 910). If the administrator should be notified (step 920=YES), then notification is sent to the administrator that the profile has been added to the system profiles 176 (step 930). The new profile is broadcast to the parent documents (step 940) and method 660 is done. If the administrator should not be notified (step 920=NO), then the new profile is broadcast to the parent documents (step 940) without notifying the administrator.

Figure 10:
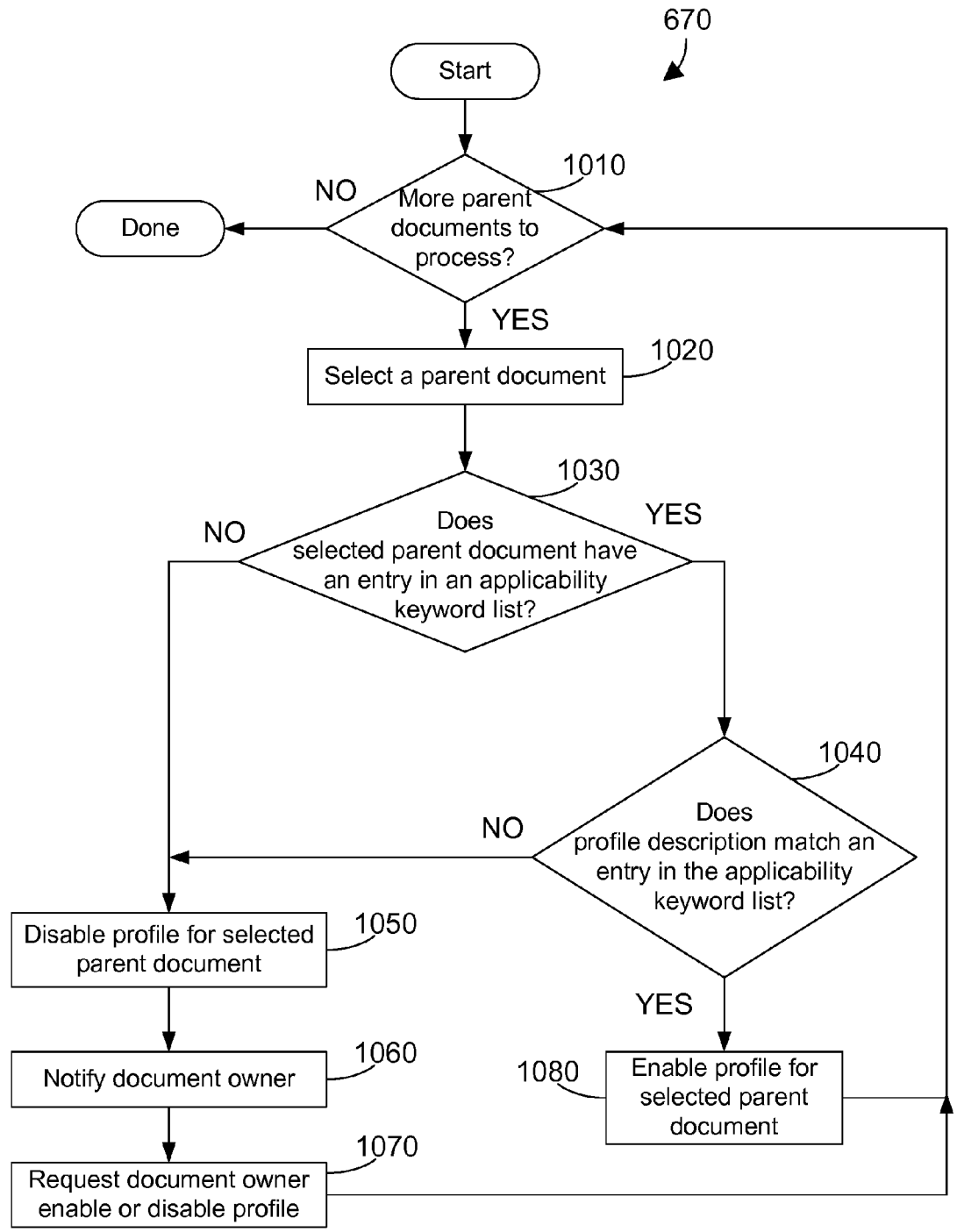
FIG. 10 is a flow diagram of a method for one suitable implementation of step 670 shown in FIG. 6.

FIG. 10 shows a method 670 for one suitable implementation for step 670 shown in FIG. 6. While there are still parent documents that have not been processed (step 1010=YES) one of the remaining parent documents is selected (step 1020). If the selected parent document has entries in an applicability keyword list (step 1030=YES), then method 670 goes to step 1040. If the profile description matches an entry in the selected parent document's applicability keyword list (step 1040=YES), then the profile is enabled on the selected parent document (step 1080) and method 670 returns to step 1010. If the selected parent document does not have entries in an applicability keyword list (step 1030=NO), then the profile is disabled for the selected parent document (step 1050). The owner of the selected parent document is notified (step 1060). The owner of the selected parent document can enable the profile or keep the profile disabled (step 1070), and method 670 returns to step 1010. If the profile description does not match an entry in the selected parent document's applicability keyword list (step 1040=NO), then steps 1050, 1060 and 1070 described above are performed. Method 670 returns to step 1010 until all parent documents have been processed (step 1010=NO), at which time method 670 is done.

Figure 11:
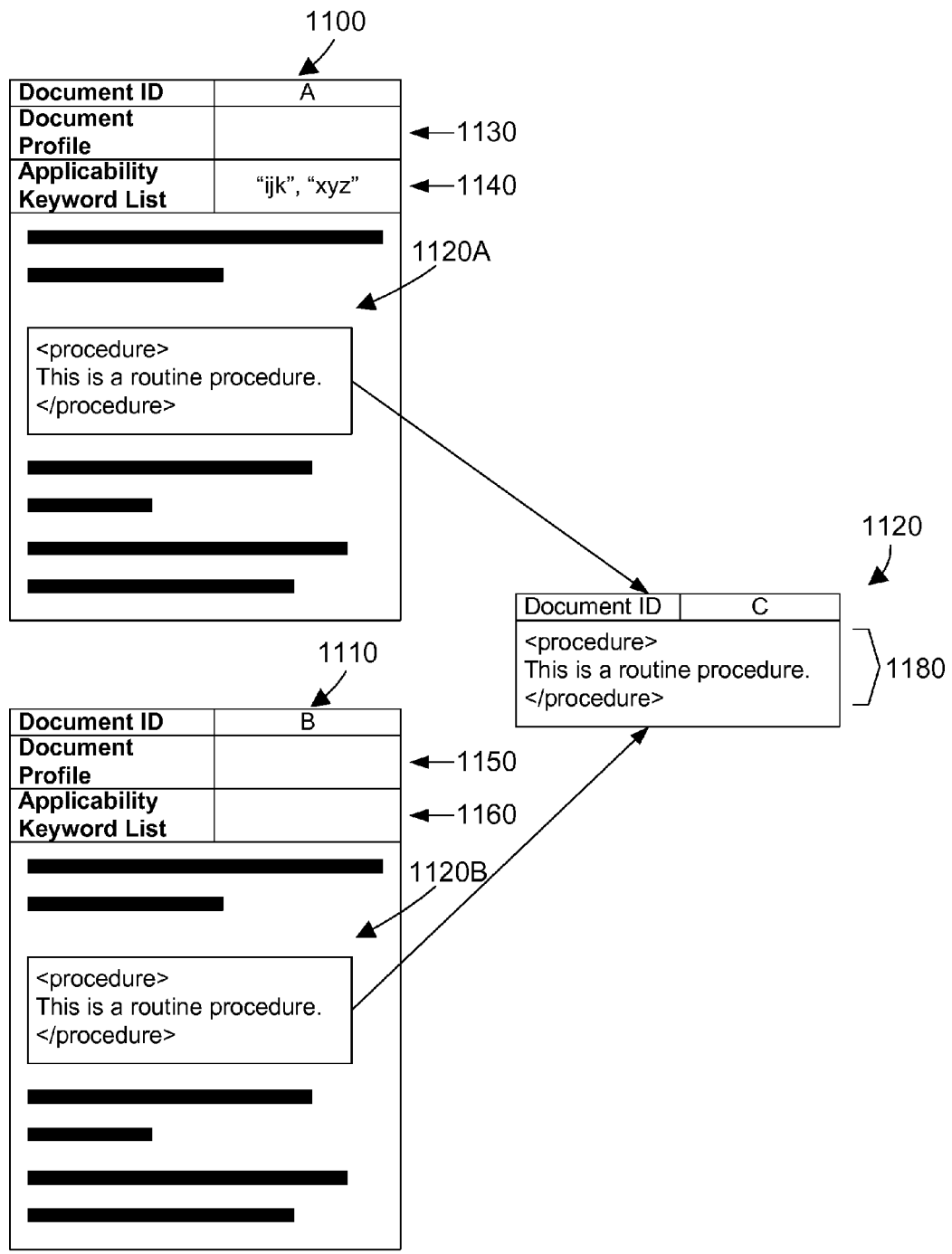
FIG. 11 shows a sample set of parent documents and a shared document.

A simple example is now given to illustrate many of the concepts described above. FIG. 11 shows two sample parent documents 1100 labeled document A and 1110 labeled document B that both contain shared document 1120 labeled document C, which contains a single element 1180. Document 1100 contains a document profile 1130 and an applicability keyword list 1140. Notice that document profile 1130 is empty, but applicability keyword list 1140 contains entries "ijk" and "xyz". Document 1110 contains a document profile 1150 and an applicability keyword list 1160. Notice that both document profile 1150 and applicability keyword list 1160 are empty. Shared document 1120 is included in both document 1100 and document 1110 shown as shared document 1120A in document 1100 and shared document 1120B in document 1110.

Figure 12:
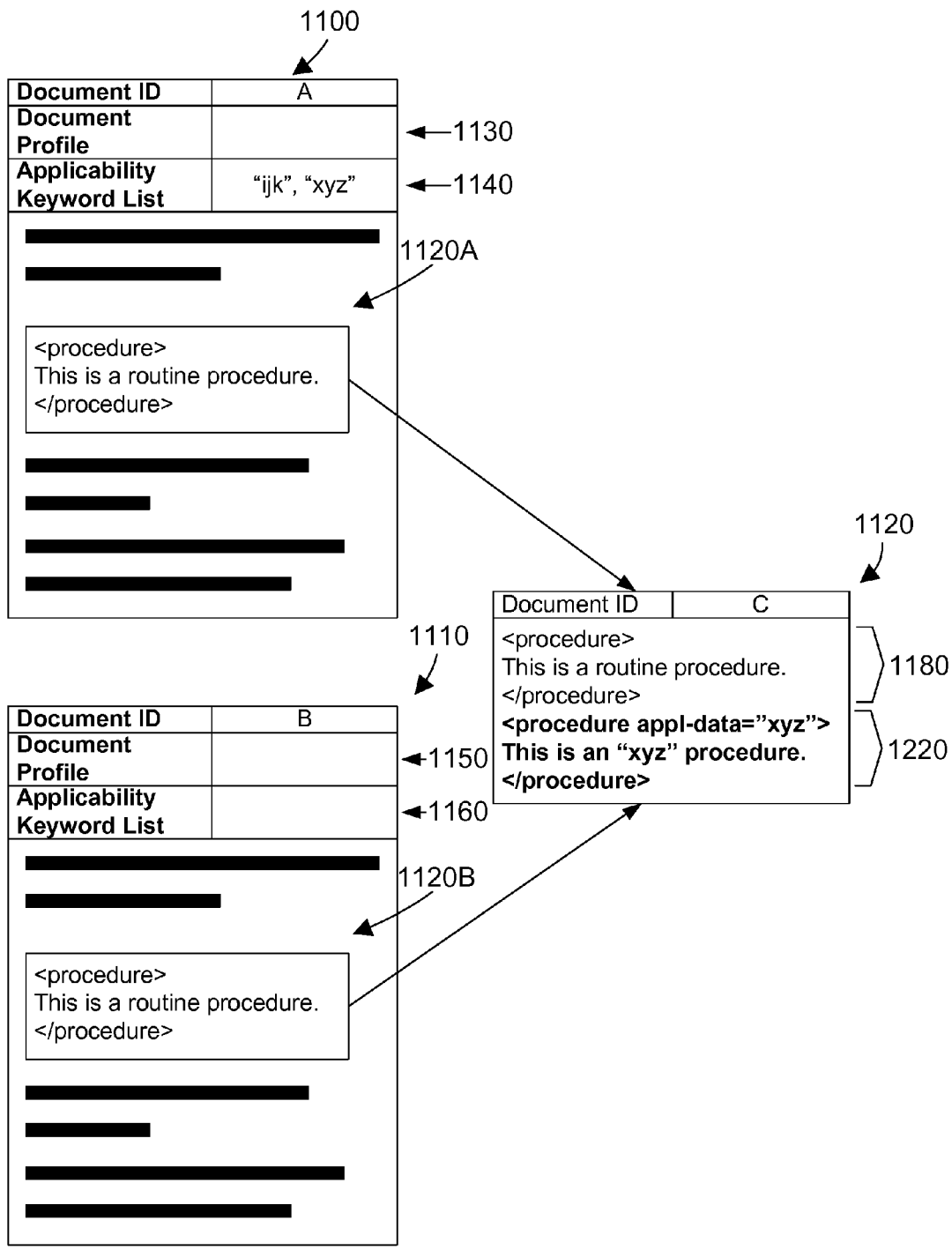
FIG. 12 shows the same set of parent documents in FIG. 11 with a shared document that has changed data.

Referring to FIG. 12, we assume a user changes shared document 1120 as shown (step 410 shown in FIGS. 4 and 6) to include a new element 1220 shown in bold in FIG. 12. In response to detecting this change, applicability metadata is inserted into new element 1220 (step 420 shown in FIGS. 4 and 6). The applicability metadata in new element 1220 is denoted by "appl-data="xyz"", meaning this element matches the "xyz" profile. It is not specified in the example herein whether the metadata was given by a user, or generated automatically, but either choice is acceptable for the given example. Parent document 1100 and parent document 1110 are then both notified of the addition of element 1220 to shared document 1120 (step 610 shown in FIG. 6). Parent document 1100 and parent document 1110 then place a vote to accept or reject the change made to shared document 1120 (step 620 shown in FIG. 6).

In the present example, document 1100 and document 1110 both place votes differently. First we select document 1100 (step 720 in FIG. 7). Document 1100 does have entries in an applicability keyword list (step 730=YES) so a vote is automatically submitted (step 750). The applicability metadata in new element 1220 is "xyz". This applicability metadata matches element "xyz" in applicability keyword list 1140 (step 810=YES in FIG. 8), therefore a vote to accept the change is automatically submitted (step 820). We then select parent document 1110 (step 720 in FIG. 7). Document 1110 does not have an entry in its applicability keyword list (step 730=NO), so a vote is requested from the owner of parent document 1110 (step 740 shown in FIG. 7).

Figure 14:
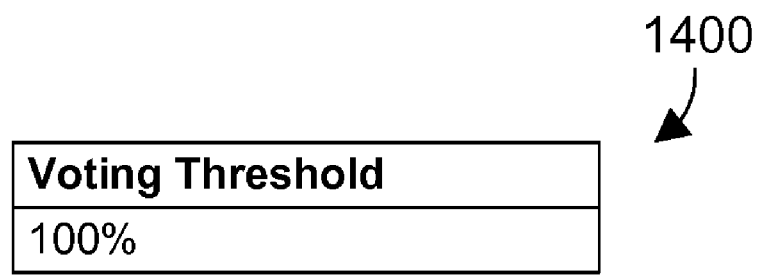
FIG. 14 shows a sample voting threshold.

A sample voting threshold 1400 is shown in FIG. 14 as one suitable example for voting threshold 175 shown in FIG. 1. Notice that the threshold is 100%, meaning all of the parent documents must accept the change to the shared content to remove the applicability metadata for the shared content. For the current example document 1100 automatically submits a vote to accept the change. We will assume that the owner of document 1110 submits a vote to reject the change. With document 1100 accepting the change and document 1110 rejecting the change, voting threshold 1400 is not satisfied (step 630=NO in FIG. 6). The applicability metadata remains in the changed document (step 650). A new profile is generated and added to the system profiles 176 (step 910 in FIG. 9). Each parent document is then notified, and the new profile is broadcast to each of the parent documents (step 940 in FIG. 9). The profiles for the parent documents that accepted the change are then enabled (step 670 in FIG. 6).

Figure 13:
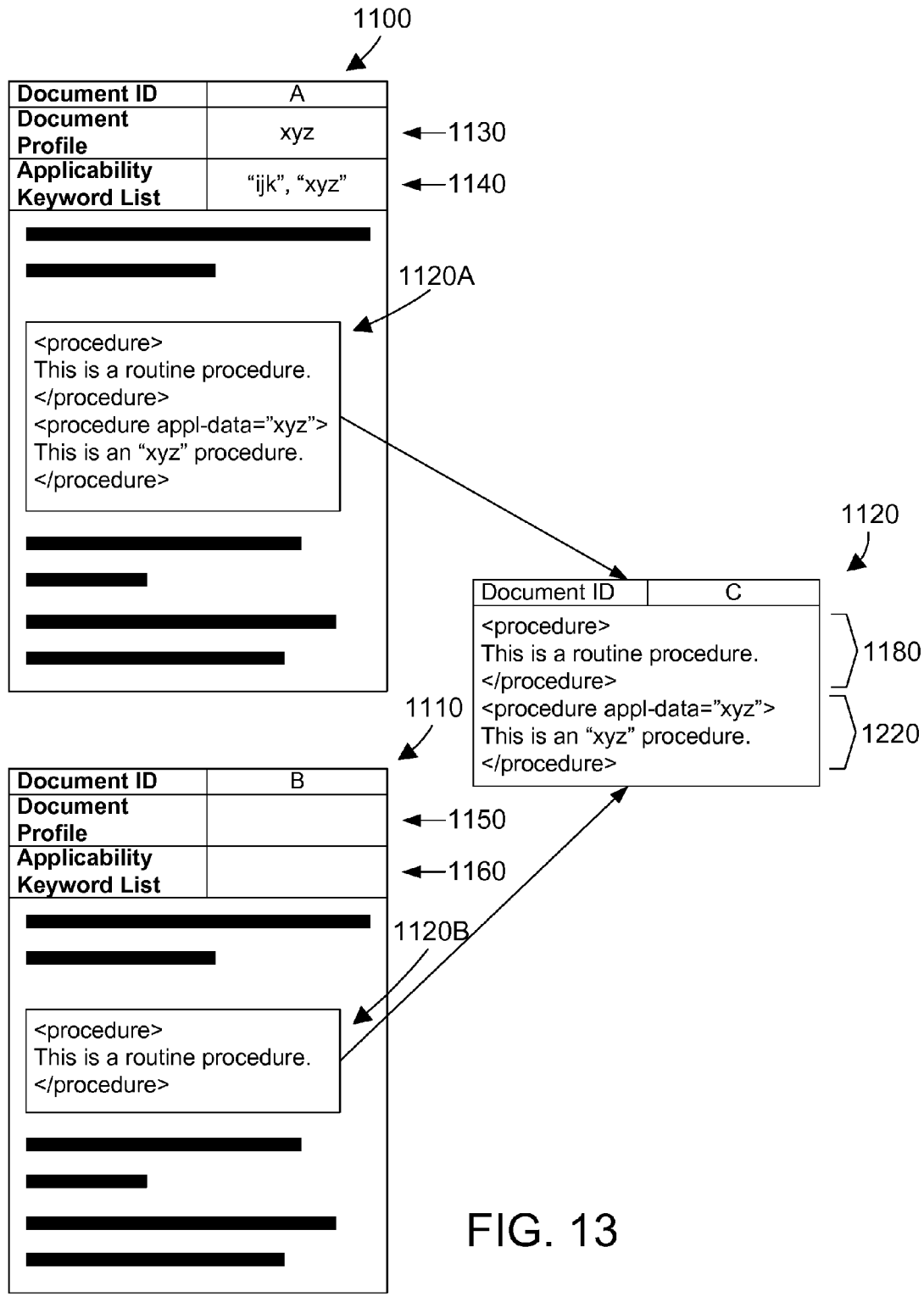
FIG. 13 shows the same set of parent documents in FIGS. 11 and 12 with profiling that controls whether the parent documents accept or reject the changed data in the shared document.

One suitable implementation to enable profiles for the parent documents is shown in FIG. 10. First we select document 1100 (step 1020). Document 1100 does have entries in its applicability keyword list (step 1030=YES). The profile description for the changed shared document matches an entry in applicability keyword list 1140 for document 1100 (step 1040=YES), so the profile for document 1100 is enabled as shown in document profile 1130 in FIG. 13 (step 1080). In the alternative, instead of automatically enabling the profile for document 1100 in step 1080, the owner of document 1100 could be notified, and in response, the owner can then enable or disable the profile. Notice that document profile 1130 in FIG. 13 has the profile "xyz" enabled. Document 1110 is then selected (step 1020). Document 1110 does not have entries in its applicability keyword list (step 1030=NO) so the profile is not enabled (step 1050). The owner of the parent document is notified (step 1060), and in response, the owner can then enable or disable the profile (step 1070). Notice in FIG. 13 that document profile 1150 for document 1110 is empty. Since the change to document 1120 was not accepted by both parent documents, thereby satisfying the voting threshold 1400 in FIG. 14, applicability metadata tags still remain in document 1120 in FIG. 13. As seen in FIG. 13, when document 1120 is included in document 1100, element 1180 is included because it is included in all documents that contain document 1120, and element 1220 is included because document 1100 contains the "xyz" profile, which matches the applicability metadata "xyz" for element 1220. When the same document 1120 is included in document 1110, element 1180 is included because it is included in all documents that contain document 1120, but element 1220 is not included because document 1110 does not contain the "xyz" profile. Thus documents 1100 and 1110 can include document 1120, and element 1120A can be different from element 1120B due to the profiling of the changes to the shared document, as shown in FIG. 13.

Figure 15:
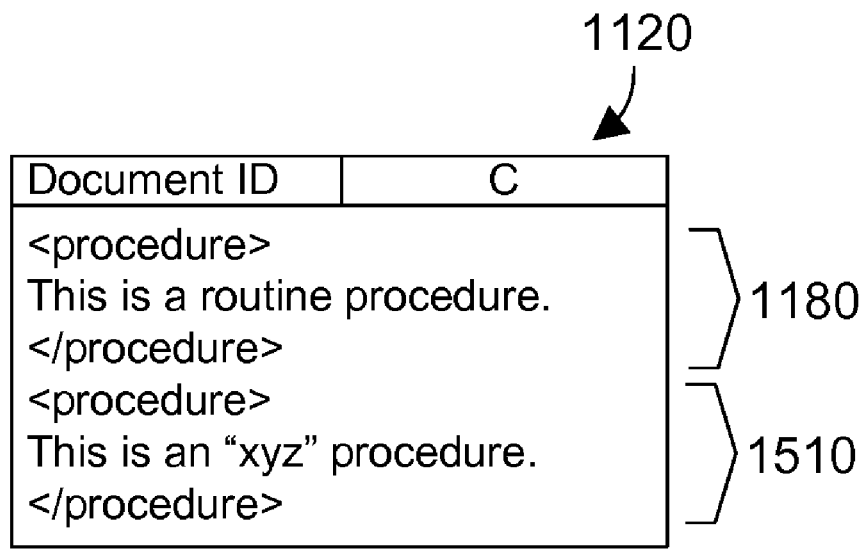
FIG. 15 shows the sample shared document 1120 from FIGS. 11-13 after the applicability metadata has been removed.

In the above example, voting threshold 1400 was not met. If, however, the owner of document 1110 voted to accept the change, then 100% of parent documents would have accepted the change, and voting threshold 1400 would have been satisfied (step 630=YES in FIG. 6). The applicability metadata would then be removed from element 1220, as shown in element 1510 in FIG. 15. Notice there is no more applicability metadata in FIG. 15, so each time document 1120 is included in a document, both elements 1180 and 1510 will be included.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
   at least one processor;
   a memory coupled to the at least one processor;
   a repository residing the memory that includes a plurality of documents; and
   a content management system residing in the memory and executed by the at least one processor, the content management system managing the plurality of documents in the repository, the content management system comprising:
   a content modification mechanism that detects a change to a shared document in the repository, and in response thereto, inserts applicability metadata in the shared document; and
   a voting mechanism that receives votes from parent documents of the shared document to accept or reject the change made to the shared document, wherein if the votes received from the parent documents to accept the change meet a defined voting threshold, the content modification mechanism removes the applicability metadata in the shared document.

2. The apparatus of claim 1 wherein the content modification mechanism notifies parent documents to the shared document of the change made to the shared document.

3. The apparatus of claim 1 wherein if the votes received from the parent documents to accept the change do not meet the defined voting threshold, the content modification mechanism broadcasts a new profile corresponding to the change to the parent documents that voted to accept the change.

4. The apparatus of claim 1 wherein the parent documents have an associated applicability keyword list that allows the voting mechanism to automatically vote to accept the change made to the shared document by a selected parent document when the applicability keyword list for the selected parent document includes a keyword corresponding to the applicability metadata in the shared document, and to automatically vote to reject the change made to the shared document when the applicability keyword list for the selected parent document does not include a keyword corresponding to the applicability metadata in the shared document.

5. A computer-implemented method for making changes to shared content in a content management system, the method comprising the steps of:
   detecting a change to a shared document in a repository managed by the content management system;
   in response to the detected change, inserting applicability metadata in the shared document;
   each parent document voting to accept or reject the change made to the shared document; and
   removing the applicability metadata in the shared document if the votes received from the parent documents to accept the change meet a defined voting threshold.

6. The method of claim 5 further comprising the step of notifying parent documents to the shared document of the change made to the shared document.

7. The method of claim 5 further comprising the step of broadcasting a new profile corresponding to the change to the parent documents that voted to accept the change if the votes received from the parent documents to accept the change do not meet the defined voting threshold.

8. The method of claim 5 wherein if a parent document has an associated applicability keyword list, performing the steps of:
   automatically voting to accept the change made to the shared document by a selected parent document when the applicability keyword list for the selected parent document includes a keyword corresponding to the applicability metadata in the shared document; and automatically voting to reject the change made to the shared document when the applicability keyword list for the selected parent document does not include a keyword corresponding to the applicability metadata in the shared document.

9. A computer-implemented method making changes to shared content in a content management system, the method comprising the steps of:
    detecting a change to a shared document in a repository managed by the content management system;
    in response to the detected change, inserting applicability metadata in the shared document;
    notifying each parent document that shares the shared document of the change to the shared document;
    if a selected parent document has an associated applicability keyword list, and if the applicability keyword list for the selected parent document includes a keyword corresponding to the applicability metadata in the shared document, automatically casting a vote for the selected parent document to accept the change made to the shared document by the selected parent document;
    if the selected parent document has an associated applicability keyword list, and if the applicability keyword list for the selected parent document does not include a keyword corresponding to the applicability metadata in the shared document, automatically casting a vote for the selected parent document to reject the change made to the shared document by the selected parent document;
    if the selected parent document does not have an associated applicability keyword list, requesting a vote from an owner of the selected parent document;
    if the votes from the parent documents to accept the change exceed a predefined voting threshold, removing the applicability metadata in the shared document;
    if the votes from the parent documents to accept the change does not exceed the predefined voting threshold, broadcasting a new profile corresponding to the change to the parent documents that voted to accept the change to the shared document.

10. An article of manufacture comprising:
    (A) a content management system comprising:
        a content modification mechanism that detects a change to a shared document in a repository, and in response thereto, inserts applicability metadata in the shared document; and
        a voting mechanism that receives votes from parent documents of the shared document to accept or reject the change made to the shared document, wherein if the votes received from the parent documents to accept the change meet a defined voting threshold, the content modification mechanism removes the applicability metadata in the shared document; and
    (B) computer-readable media bearing the content management system.

11. The article of manufacture of claim 10 wherein the content modification mechanism notifies parent documents to the shared document of the change made to the shared document.

12. The article of manufacture of claim 10 wherein if the votes received from the parent documents to accept the change do not meet the defined voting threshold, the content modification mechanism broadcasts a new profile corresponding to the change to the parent documents that voted to accept the change.

13. The article of manufacture of claim 10 wherein the parent documents have an associated applicability keyword list that allows the voting mechanism to automatically vote to accept the change made to the shared document by a selected parent document when the applicability keyword list for the selected parent document includes a keyword corresponding to the applicability metadata in the shared document, and to automatically vote to reject the change made to the shared document when the applicability keyword list for the selected parent document does not include a keyword corresponding to the applicability metadata in the shared document.

* * * * *